United States Patent [19]

Takagai

[11] Patent Number: 5,381,200
[45] Date of Patent: Jan. 10, 1995

[54] LENS-FITTED PHOTOGRAPHIC FILM UNIT

[75] Inventor: Junichi Takagai, Saitama, Japan

[73] Assignee: Fuji Photo Film Co., Ltd., Kanagawa, Japan

[21] Appl. No.: 62,185

[22] Filed: May 17, 1993

[30] Foreign Application Priority Data

May 18, 1992 [JP] Japan ................................ 4-124519
Mar. 3, 1993 [JP] Japan ................................ 5-042879

[51] Int. Cl.⁶ ........................ G03B 9/10; G03B 17/02
[52] U.S. Cl. .................................. 354/250; 354/288
[58] Field of Search ............... 354/250, 251, 252, 288, 354/287, 217

[56] References Cited

U.S. PATENT DOCUMENTS

| | | | |
|---|---|---|---|
| 3,709,135 | 1/1973 | Simon et al. | 354/250 |
| 3,713,374 | 1/1973 | Shiratory et al. | 354/250 |
| 4,755,842 | 7/1988 | Barclay et al. | 354/217 |
| 4,884,087 | 11/1989 | Mochida et al. | 354/288 X |
| 5,063,400 | 11/1991 | Takei et al. | 354/288 |
| 5,084,719 | 1/1992 | Hara et al. | 354/288 X |
| 5,181,057 | 1/1993 | Takagi et al. | 354/250 |

Primary Examiner—Howard B. Blankenship
Assistant Examiner—Jae N. Noh
Attorney, Agent, or Firm—Young & Thompson

[57] ABSTRACT

A lens-fitted photographic film unit is provided with a shutter blade having a claw portion and a masking portion for opening and closing a shutter opening formed in the front surface of the base section of the film unit. The shutter blade is bent between the claw portion and the masking portion in a crank-shape such that the claw portion is swung in a rearward plane different from that of the masking portion, making it possible to form the film unit thinner. In a preferred embodiment, the masking portion is provided on its rear with a recess having a tapered surface. During swinging, the tapered surface will not be in contact with the projection surrounding the shutter opening, enabling smooth swinging of the shutter blade, when the shutter blade is in the closed position, the projection fits in the recess. The shutter blade is formed on an edge portion with a protrusion for opening and closing a stop aperture. In the closed position, half of the masking portion is surrounded by a semicircular light-shielding member.

25 Claims, 10 Drawing Sheets

LENS-FITTED PHOTOGRAPHIC FILM UNIT

BACKGROUND OF THE INVENTION

1. Field of the Invention

The present invention relates to a lens-fitted photographic film unit and more particularly to a lens-fitted photographic film unit having an improved kick-type shutter blade.

2. Prior Art

Lens-fitted photographic film units (hereinafter simply referred to as film units) are well known having a simple photograph-taking mechanism as disclose din U.S. Pat. No. 4,884,087. Such film units can be purchased nearly everywhere at low prices, making it possible to take photographs anywhere without carrying about heavy and expensive cameras.

Such a film unit has a main body with a taking lens, a shutter mechanism and a single-frame advancing mechanism, and front and rear covers. A 135-type photographic film cassette defined by ISO code 1007, 1979 version and a photographic film that has been drawn out of the photographic film cassette and wound in a roll are contained in the main body in a light-tight manner. Thus, the 135-type photographic film cassette used in the film unit can be subjected to photographic printing systems now in operation to obtain photoprints at low cost.

The thickness of the film unit is only slightly greater than the diameter of the photographic film cassettes, so as to render the unit more readily portable. However, there have been carried out studies to make the size of compact cameras approach the size of a credit card or a cigarette case. In this connection, it is desired to further miniaturize the film unit whilst still using a 135-type photographic film cassette.

There is disclosed a much more compact film unit with a 135-type photographic film cassette in U.S. application Ser. No. 07/928,703. In this film unit, the front outside surface of the film takeup chamber containing the cassette projects forward relative to the front outside surface of the film supply chamber. Correspondingly, a portion of the front cover follows the outline of the front outside surface of the film take-up chamber such that the projecting portion serves as a grip portion while the other portion of the front cover is flat and disposed rearwardly. The front cover is provided with a lens hood projecting therefrom in order to accommodate a taking lens and to dispose it at the same distance from the surface of the photographic film as in conventional film units.

Furthermore, a single kick-type shutter blade is used in order to permit manufacture of the film unit at low cost. The shutter blade is rotatably mounted on a flat shutter mount and has a claw portion and a masking portion for opening closing the shutter opening. Upon depression of a shutter release button, a shutter actuating lever is swung from a charge position into an initial position because of the force of a spring. At this time, the claw portion of the shutter blade is hit by the shutter actuating lever. Thereby, the shutter blade is swung against the force of a spring to open the shutter opening for an exposure. Instantly, the shutter blade is returned to the initial position owing to the force of the spring to terminate the exposure.

The shutter blade needs to be disposed directly behind the taking lens in order to prevent unevenness of exposure. Therefore, it is necessary to provide that the lens hood project not only in the region of the taking lens but also in the region wherein the shutter blade is swung. Besides, a gap is formed between the shutter blade and the shutter mount so as to make the shutter blade swing smoothly. However, in that case, there is a danger that external light can enter through the shutter opening through the gap. There has accordingly been suggested a shutter mechanism in which a projection is formed on a shutter mount so as to surround the shutter opening and cooperate with a projection formed on the rear side edge of the masking portion of the shutter blade to prevent external light from entering the shutter opening.

The shutter blade is attached to the shutter mount so as to leave a narrow gap between the shutter blade and the shutter mount. Then, if the rear surface of the masking portion is rough, it is rubbed by the projection of the shutter base plate due to ambient vibrations, which prevents smooth driving of the shutter blade. As a result, it is necessary to manufacture the shutter blade as accurately as possible, resulting in high cost of the product.

SUMMARY OF THE INVENTION

It is therefore an object of the present invention to provide a lens-fitted photographic: film unit having a single kick-type shutter blade appropriate for its miniaturization.

It is another object of the present invention to provide a lens-fitted photographic film unit in which light is prevented from entering through the gap between the shutter blade and the shutter opening.

It is still another object of the present invention to provide a lens-fitted photographic film unit in which the shutter blade can be driven smoothly.

To achieve the above and other objects and advantages of the present invention, a lens-fitted photographic film unit is provided with a swingable shutter blade which is bent at an elbow portion in a crank shape. At one end of the arm portion is formed a claw portion which is hit by a shutter actuating lever when a shutter release button is depressed. At another end of the arm portion is formed a masking portion which moves from a closed position for blocking light from entering a shutter opening to an open position for allowing light to enter the shutter opening. The film unit comprises a base section having a mechanism mount and a shutter mount which is formed integrally with a projected portion projecting forward along the optical axis of the unit. The shutter opening is formed in the front surface of the projected portion. The shutter blade is attached swingably to the shutter mount in the vicinity of the claw portion. On the other hand, the masking portion is disposed on the front surface of the projected portion in opposition to the shutter opening. Therefore, the claw portion is swung in a plane different from that of the masking portion. According to this invention, it is possible to dispose the masking portion behind a taking lens in the same position as is conventional, and to dispose the claw portion in a retracted position along the optical axis. As a result, the thickness of the film unit can be reduced in the vicinity of the taking lens, thereby contributing to miniaturization of the film unit.

In a preferred embodiment, the masking portion of the shutter blade is provided on its rear surface with a recess surrounded by a rim which has a cutout on the side of a trailing edge portion of the masking portion defined at the time when said shutter blade is swung from a closed position to an open position. The recess has a tapered surface extending over approximately half thereof on the side of the trailing edge portion. On the other hand, a shutter mount of a base section is formed integrally with the projection in which the shutter opening is formed. The projection is fitted in the recess of the masking portion when the shutter blade is in the closed position. A light-shielding wall is formed on the right side of the shutter opening so as to prevent light from entering the shutter opening on the side of the trailing edge portion of the shutter blade. According to this embodiment, the shutter blade can be driven smoothly since the tapered surface will not be in contact with the projection. Furthermore, because the projection is fitted into the recess in the closed position, light is prevented from entering the gap between the shutter blade and the base section due to a combination of the projection, the rim and the light-shielding wall. Therefore, there is no need to manufacture the shutter blade with high precision, and this makes it possible to produce the film unit at low cost.

In another preferred embodiment, the shutter blade is provided thereon with a protrusion protruding toward a stop aperture. The protrusion has an inclined surface on what is the trailing edge portion when the shutter blade is swung from a closed position to an open position. The root portion of the protrusion is thinner than the most protruding portion thereof. After the shutter blade has opened the shutter opening slightly, the protrusion then opens the stop aperture to enable an exposure. When the protrusion has passed the aperture, the exposed is executed fully due to the inclined surface even before the shutter opening is fully opened. With this construction, exposure of the picture frame can be performed uniformly.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
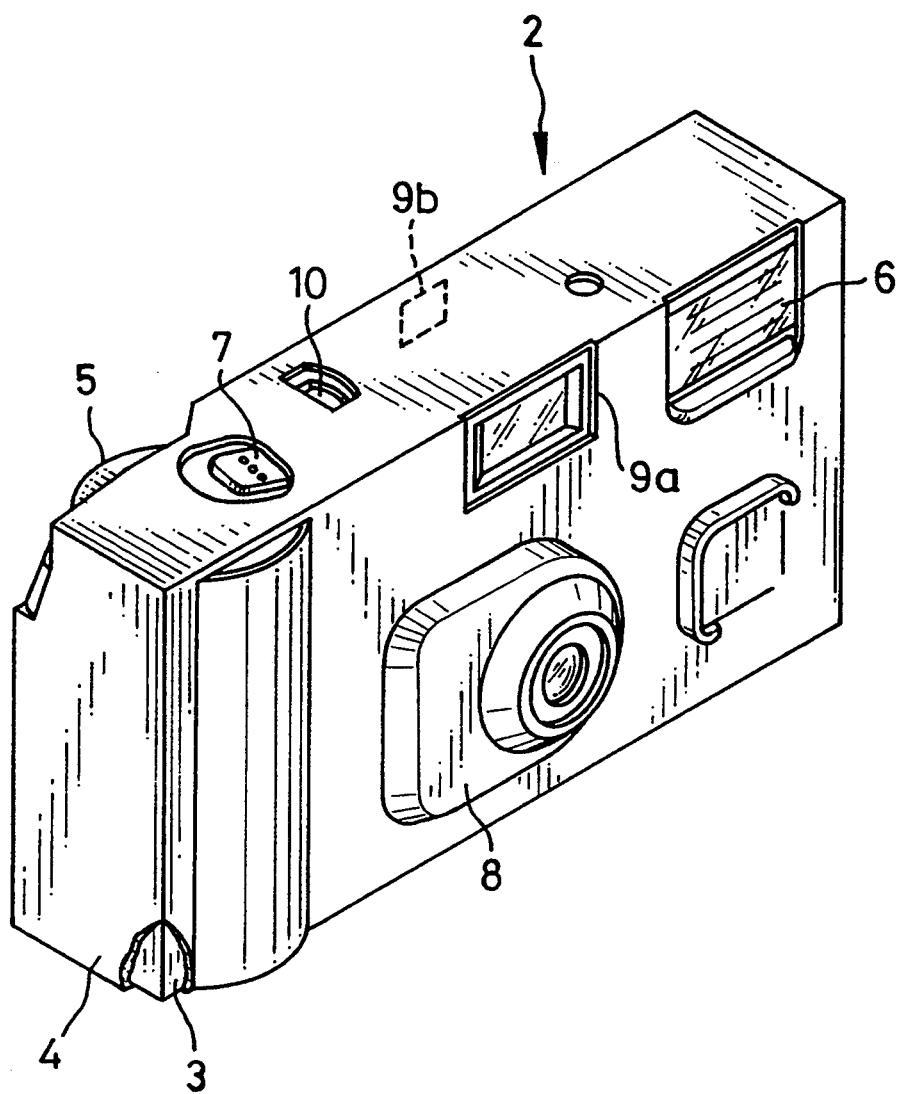
FIG. 1 is a perspective view illustrating a lens-fitted photographic film unit according to a first preferred embodiment of the invention.

Referring to FIG. 1, a lens-fitted photographic film unit 2 is compactly formed for convenience of portability and consists of an outer casing 4 and a film housing 3 having a simple photograph-taking function. The outer casing 4 has openings for exposing a film advancing wheel 5, a flash window, a shutter release button 7, a lens hood 8, a front finder window 9a, a rear finder window 9b and a film frame counter disk 10 and the like.

Figure 2:
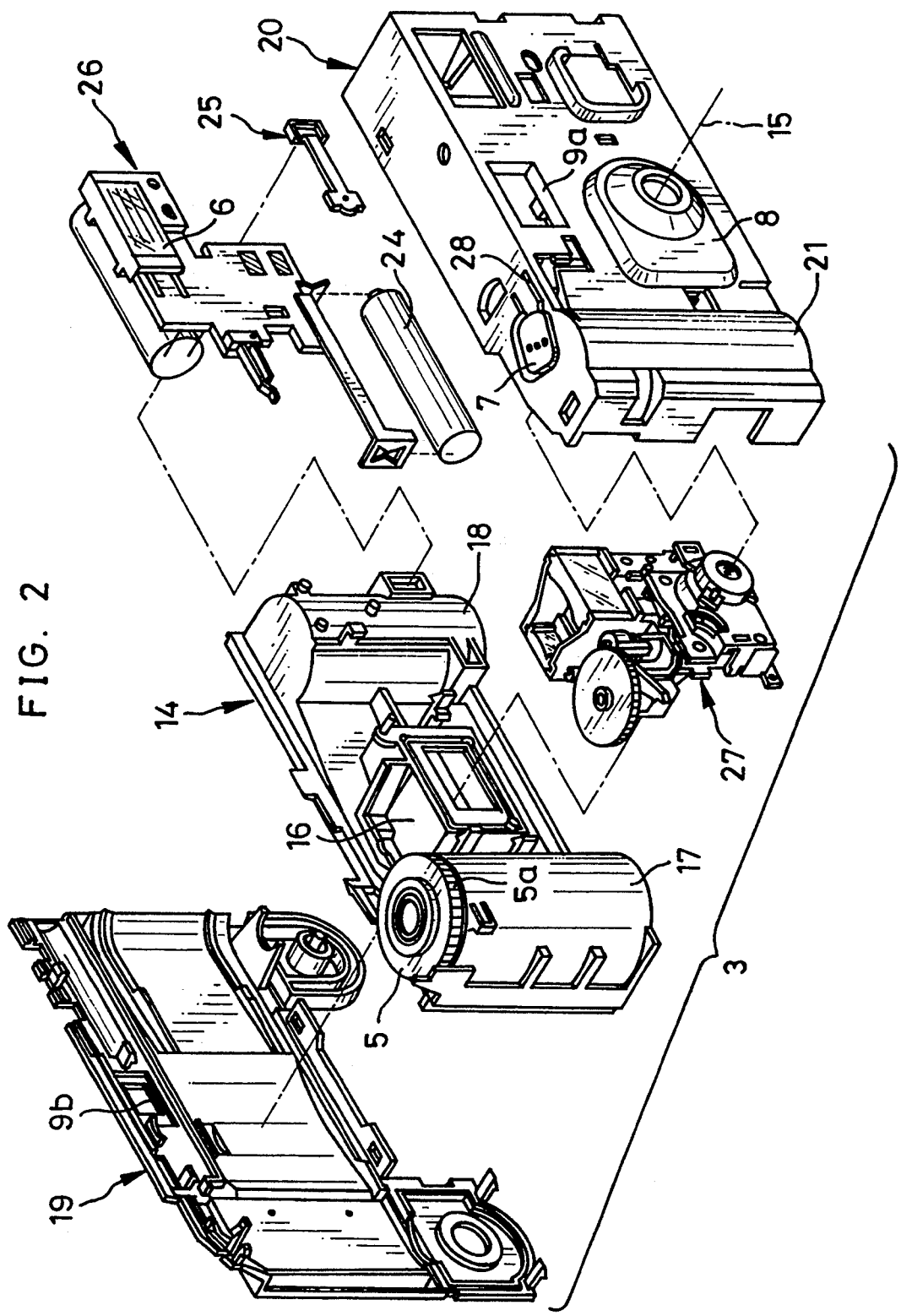
FIG. 2 is an exploded perspective view illustrating the film housing of the film unit of FIG. 1.

In FIG. 2 illustrating the film housing 3, a main body 14 has a film take-up chamber 17 and a film supply chamber 18 on opposite horizontal sides of an exposure chamber 16 disposed on the optical axis 15 of the unit. The main body 14 is configured such that the front outside surface of the film take-up chamber 17 projects forward as compared with the front outside surface of the film supply chamber 18.

In assembled condition, 135-type photographic film cassette (not shown) is contained in the film take-up chamber 17 and a photographic film 13 (FIG. 4) which has been drawn out of the photographic film cassette and wound in a roll is contained in the film supply chamber 18. Thereafter, the main body 14 is closed by a rear cover 19 in a light-tight manner. In a horizontal cross section of the main body 14, the diameter of the film take-up chamber 17 is approximately equal to that of a photographic film cassette conforming to the ISO version and the diameter of the film supply chamber 18 is smaller than that of the film take-up chamber 17. The roll of photographic film 13 can be contained in the film supply chamber 18 by winding the photographic film 13 tightly and omitting a core such as a spool.

On the film take-up chamber 17, the film advancing wheel 5 engages a spool of photographic film cassette to rotate the spool to rewind the exposed film back into the cassette. The film advancing wheel 5 has teeth 5a of constant pitch. The teeth 5a serve to prevent the fingers of the user from slipping thereon and engage with a claw for stopping winding of the photographic film 13.

A flash device 26 is equipped with a battery 24, a switch segment 25, etc. A photo-taking unit 27 is equipped with a shutter mechanism, a one-frame advancing mechanism, a finder potion, etc. The flash device 26 and the photo-taking unit 27 are attached to the front of the main body 14, which is then covered by a front cover 20. A potion of the front cover 20 corresponding to the front surface of the film take-up chamber 17 projects forward along the outline of the film take-up chamber 17 to provide a grip portion 21.

The shutter release button 7 is formed integrally with the upper surface of the front cover 20 and is bordered by a slit 28. Accordingly, the shutter release button 7 after being depressed will return to the illustrated position by its own resiliency.

Figure 3:
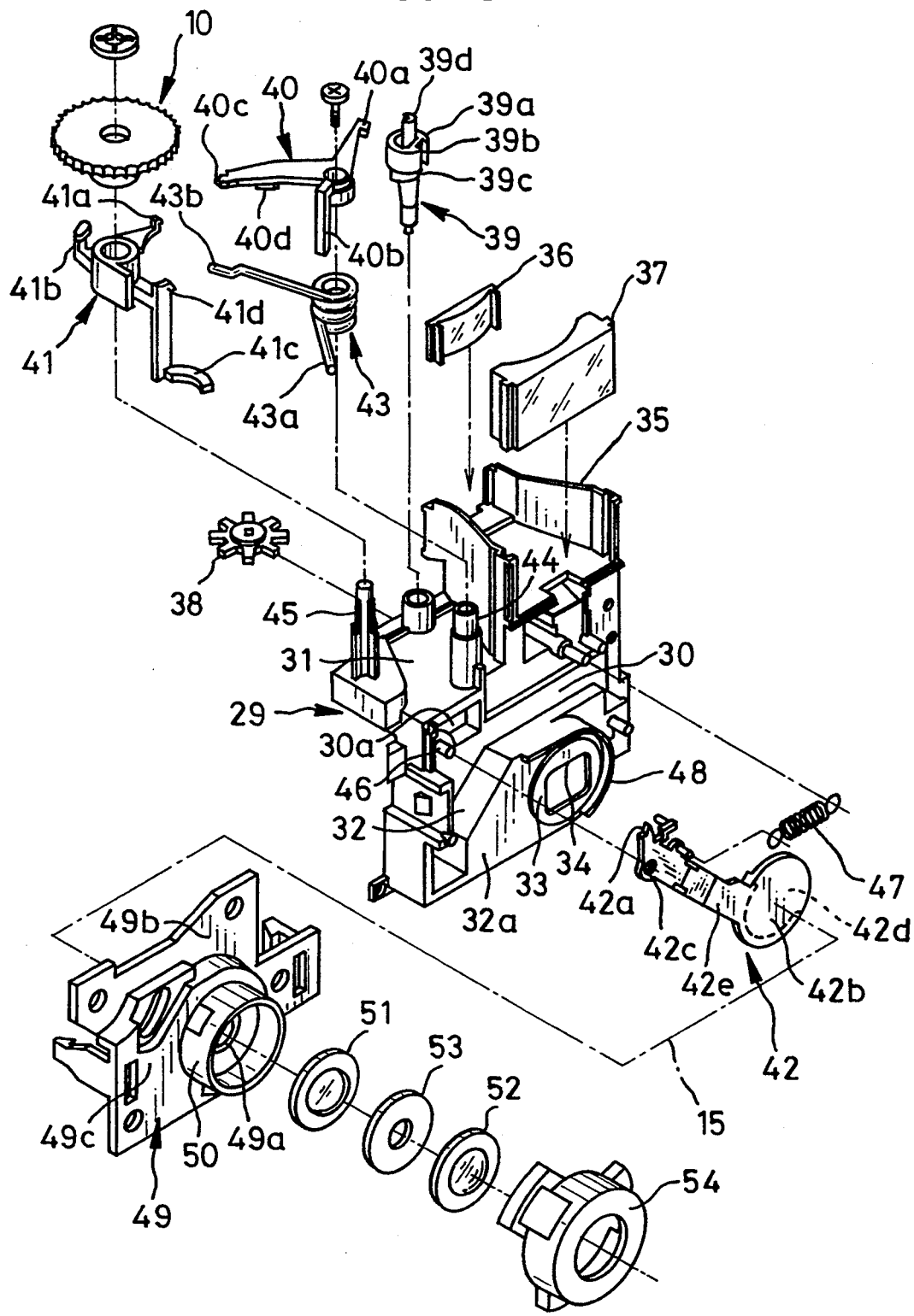
FIG. 3 is an exploded perspective view illustrating the photo-taking unit of the film housing of FIG. 2.
Figure 4:
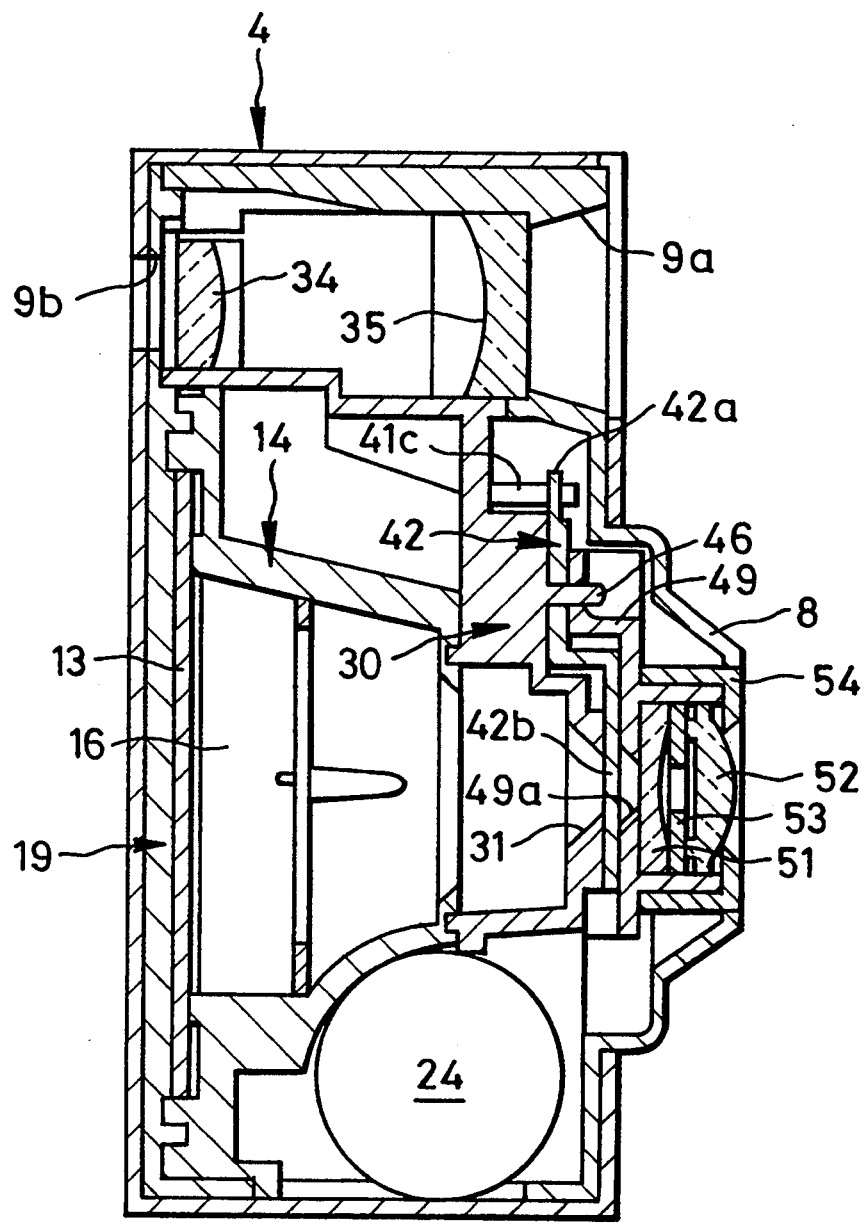
FIG. 4 is a cross section of the film unit of FIG. 1.

In FIGS. 3 and 4, a base section 29 is shown which is approximately inverted L-shaped when observed from the side and has a shutter mount 30 and a mechanism mount 31. The shutter mount 30 is formed integrally with a projected portion 32 projecting in the forward direction of the optical axis 15. The projected portion 32 further has a projection 33 slightly projecting in the same manner as the projected portion 32. A shutter operating 34 is formed in the projected portion 33. A finder lens holding frame 35 is integrally formed on the mechanism mount 31 and incorporated with lenses 36 and 37, constituting an inverted Galilean finder system.

The mechanism mount is provided with a driven sprocket wheel 38, a shutter setting cam 39, an arresting lever 40, a shutter actuating lever 41, a shutter blade 42, a spring 43, the film frame counter disk 10 and the like to form the shutter mechanism and the one-frame advancing mechanism. The sprocket wheel 38 engages with perforations in the photographic film 13 and makes one rotation while the photographic film 13 is wound by an amount corresponding to one frame. The shutter set cam 39 has an annular portion 39a with a groove 39b, a cam surface 39c and a one-tooth gear 39d, all of which are formed integrally. The shutter set cam 39 rotates together with the sprocket wheel 38.

The arresting lever 40 is mounted rotatably on a shaft 44 around which a spring 43 is provided. A distal end 40a of the arresting lever 40 is brought into contact with the annular portion 39a of the shutter setting cam 39. In the meantime, the shutter actuating lever 41 is fitted rotatably on a shaft 45. A distal end 41a of the shutter actuating lever 41 is brought into contact with the cam surface 39c of the shutter setting cam 39. An end 43a of the spring 43 presses a bent down portion 40b of the arresting lever 40 to bias the arresting lever 40 clockwise around the shaft 44 while the other end 43b presses a spring receiving portion 41b of the shutter actuating lever 41 to bias the shutter actuating lever 41 counterclockwise about the shaft 45.

Upon rotating the film advancing wheel 5 to advance the photographic film 13 by one frame after an exposure, the shutter setting cam 39 makes one rotation via the sprocket wheel 38, which causes the shutter actuating lever 41 to swing from an initial position into a charge position against the urging of the spring 43. When the groove 39b reaches to a predetermined position during one rotation of the shutter resetting cam 39, the distal end 40a of the arresting lever 40 enters into the groove 36b. At this time, the arresting lever 40 rotates slightly in the clockwise direction.

The slight rotation of the arresting lever 40 makes its engaging claw 40c engage with the teeth 5a of the film advancing wheel 5 to prohibit further winding of the photographic film 13. Simultaneously, a protrusion 40d formed on the lower surface of the arresting lever 40 engages with an engaging portion 41d of the shutter actuating lever 41 to arrest the shutter actuating lever 41 in the charge position against the urging of the spring 43. Also, the film frame counter disk 10 is rotated by the one-tooth gear 39d formed on the top of the shutter set cam 39 to advance the markings of the film frame counter disk 10 by one during a single frame advance.

Upon depression of the shutter release button 7, the arresting lever 40 starts swinging counterclockwise about the shaft 44. When the arresting lever 40 is swung through a predetermined angle, the protrusion 40d disengages from the engaging portion 41d, so that the shutter actuating lever 41 is swung swiftly counterclockwise due to the force of the spring 43. The shutter actuating lever 41 has an L-shaped arm 41c. The end of the arm 41c is located in the vicinity of the upper left corner portion of the shutter mount 30 so as to project slightly forward from the shutter mount 30 but to be disposed behind the plane of the front surface 32a of the projected portion 32.

Figure 11:
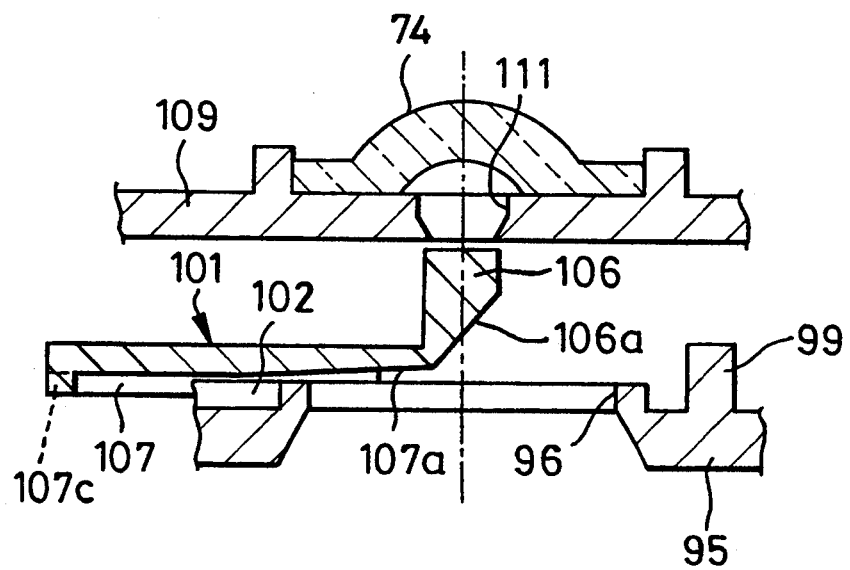
FIG. 11 is a fragmentary cross section of the shutter blade taken on the line XI—XI in FIG. 9, wherein the shutter blade is in its position at the beginning of an exposure.
Figure 12:
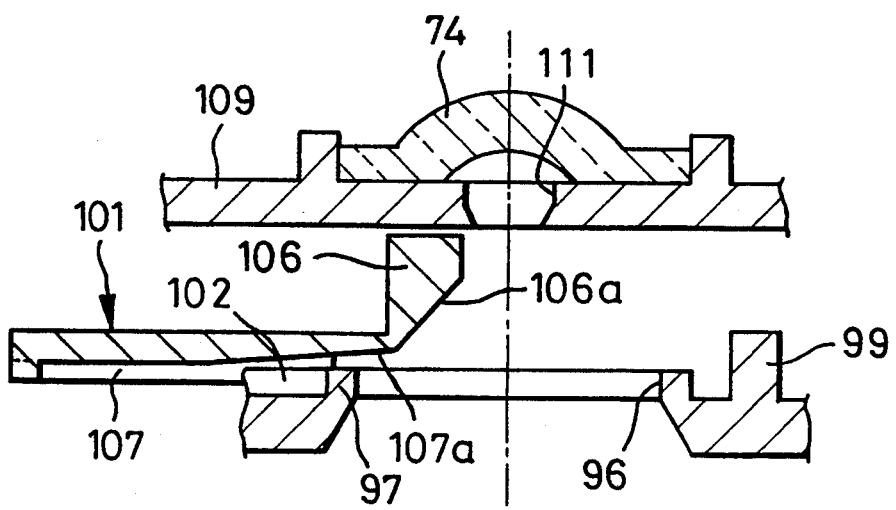
FIG. 12 is a view similar to FIG. 11 but with the shutter blade in the fully open position.
Figure 13:
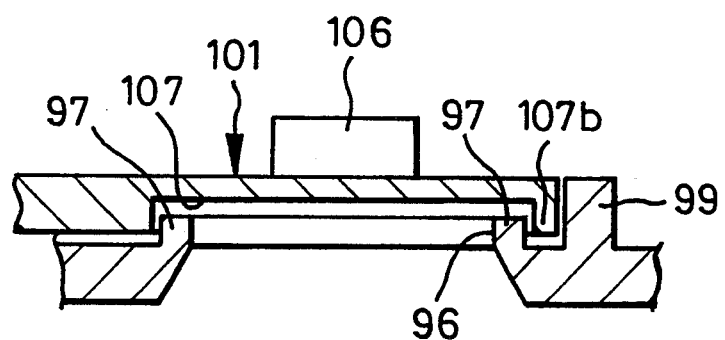
FIG. 13 is a fragmentary cross section of the shutter blade taken on the line XIII—XIII in FIG. 9, wherein a projection formed around the shutter opening is disposed in a recess in the shutter blade.

The shutter blade 42 is a one-piece plastic molding and is constituted of a claw portion 42a a masking portion 42b for opening/closing the shutter opening 34 and a hole 42c into which a pin 46 is fitted so as to attach the shutter blade 42 to the base section 29. The shutter blade 42 is bent at an arm 42e between the claw portion 42a and the masking portion 42b along the direction of the optical axis 15 into the shape of a crank. The masking portion 42b is provided on its rear surface with a recess 42d in which the projection 33 fits. The claw portion 42a is positioned in the path of the end of the arm 41c of the shutter actuating lever 41. When the claw portion 42a is hit by the arm 41c of the shutter actuating lever 41, the shutter blade 42 is swung around the pin 46 of the shutter mount 30 in a direction perpendicular to the optical axis 15. At this moment, the masking portion 42b is swung between an open position wherein it opens the shutter opening 34 and a closed position wherein it closes the shutter opening 34 owing to the force of a spring 47. Since the arm 42e of the shutter blade 42 is crank-shaped, the claw position 42a and the masking portion 42b are swung in different planes. Reference numeral 48 indicates a wall for receiving the shutter blade 42 and preventing light from entering into the shutter opening 34. The masking portion 42b is provided with the recess 42d as illustrated in FIGS. 11 to 13, but alternatively may have a flat rear surface.

In front of the shutter blade 42 is attached a shutter cover 49 having a stop aperture 49a. The shutter cover 49 has a flat portion 49b and a projected portion 49c so as to correspond to the shape of the shutter mount 30, the projecting portion 32 and the wall 48. The shutter cover 49 has an integrally formed lens holder 50 which holds two taking lenses 51, 52, a spacer 53 inserted therebetween, and a lens cover 54 to complete the assembly of the photo-taking unit 27.

Figure 5:
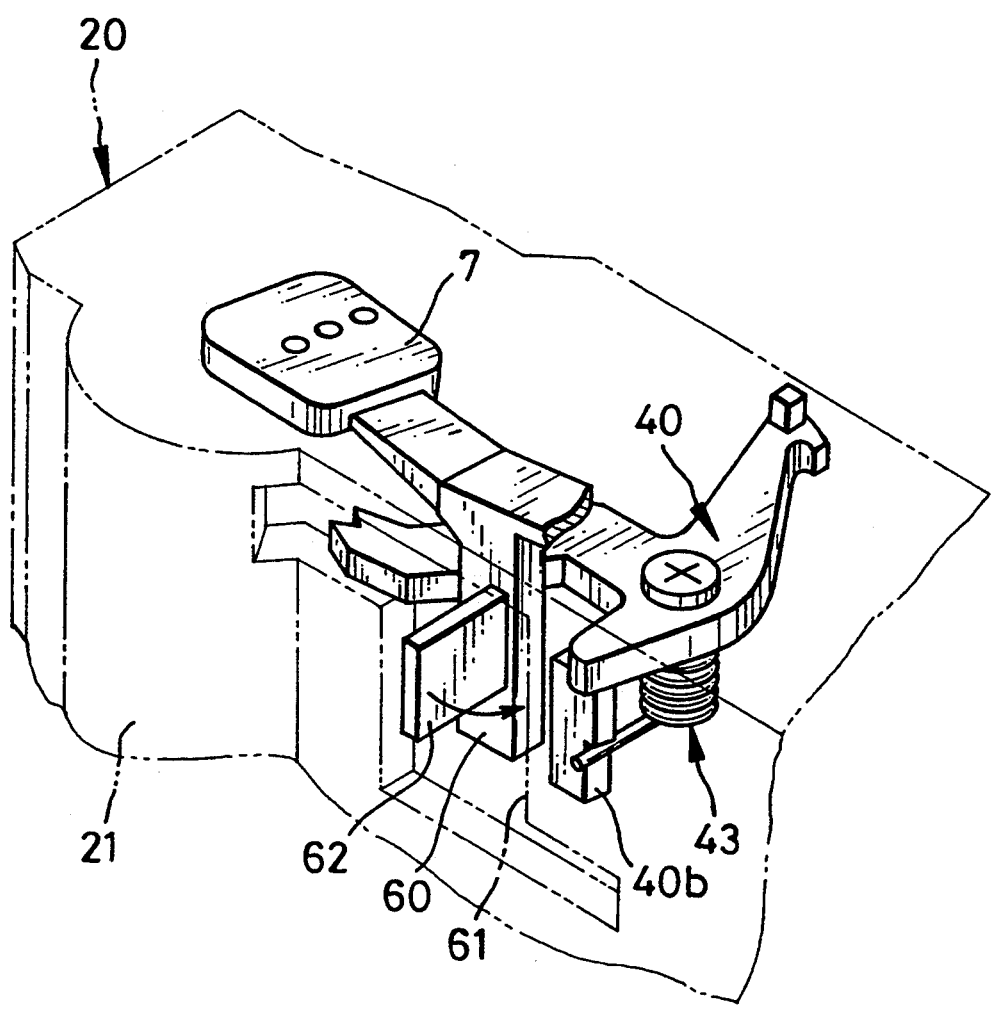
FIG. 5 is a perspective view illustrating the shutter release of the film unit of FIG. 1.

Referring to FIG. 5, the shutter release button 7 is provided on its lower surface with a release arm 60. Upon depression of the shutter release button 7, the release arm 60 presses the bent portion 40b of the arresting lever 40 to rotate the arresting lever 40 counterclockwise as seen in FIG. 5. The front cover 20 has an opening 61. A protrusion 62 is formed integrally with the release arm 60 and is disposed in the opening 61 in the front cover 20. When shutter release button 7 is depressed to a predetermined degree, the protrusion 62 comes into contact with an edge of the opening 61 to prevent further movement of the release arm 60.

The operation of the above-structured embodiment will now be described. Upon rotating the film advancing wheel 5 to advance the photographic film 13 by an amount corresponding to one frame after having taken a photography, the shutter setting cam 39 makes one counterclockwise rotation as seen in FIG. 3, which causes the shutter actuating lever 41 to be rotated clockwise (FIG. 3) due to the contact between the cam surface 39c and the distal end 41a of the shutter actuating lever 41. In the course of this clockwise rotation of the shutter actuating lever 41, the outer surface of the engaging portion 41d of the shutter actuating lever 41 contacts the inner surface of the protrusion 40d of the arresting lever 40. Thereafter, the shutter actuating lever 41 is rotated into the charge position while the arresting lever 40 is slightly rotated into a locked position to a nest the shutter actuating lever 41 in the charge position due to the engagement between the side surfaces of the engaging portion 41d and the protrusion 40d. At this time, the arm 41c of the shutter actuating lever 41 is moved from the initial position into the charge position by riding over the claw portion 42a of the shutter blade 42.

Simultaneously, during the single rotation of the shutter setting cam 39, the distal end 40a of the arresting lever 40 enters the groove 39b of the annular portion 39a, and then the arresting lever 40 is rotated further slightly in the clockwise direction. Accordingly, the engaging claw 40c engages with the teeth 5a of the film advancing wheel 5 to prevent further winding of the photographic film 13.

Upon depression of the shutter release button 7, the release arm 60 is moved to the right (FIG. 5) to urge the arresting lever 40 counterclockwise, which causes the protrusion 40d to disengage from the engaging portion 41d. As a result, the shutter actuating lever 41 is swung counterclockwise (FIG. 3) and to the strong force of the spring 43 and strikes the claw portion 42a of the shutter blade 42 with its arm 41c. Thereby, the shutter blade 42 is swung about the pin 46 from the close deposition to the open position to permit light from an object to pass through the taking lenses 51,52 and the stop aperture 49a and to fall on the photographic film 13 positioned in an exposure position behind the exposure chamber 16. The shutter blade 42 is swung back into the closed position by the force of the spring 47. Thereafter, the same operation as above is repeated to take successive photographs.

Figure 6:
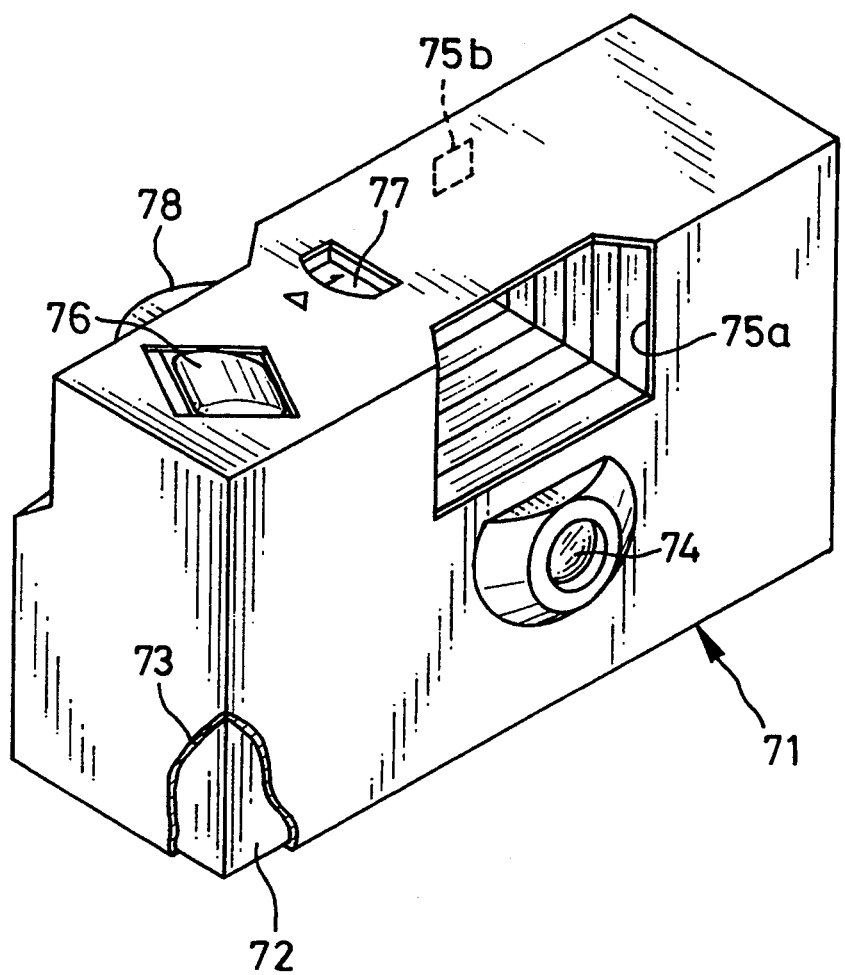
FIG. 6 is a perspective view of a lens-fitted photographic film unit according to a second F, referred embodiment of the invention.

In FIG. 6 illustrating a film unit 71 having a shutter blade with a recess according to another preferred embodiment of the present invention, the film unit 71 consists of a film housing 72 having a photograph-taking function and an outer casing 73 with illustrations and information printed thereon in which the film housing 72 is encased. The outer casing 73 is provided with openings for exposing a taking lens 74, a front finder window 75a, a rear finder window 75b, a shutter release button 76, a film frame counter disk 77 and a film advancing wheel 78. Thereby, photographs can be taken with the film housing 72 encased in the outer casing 73.

Figure 7:
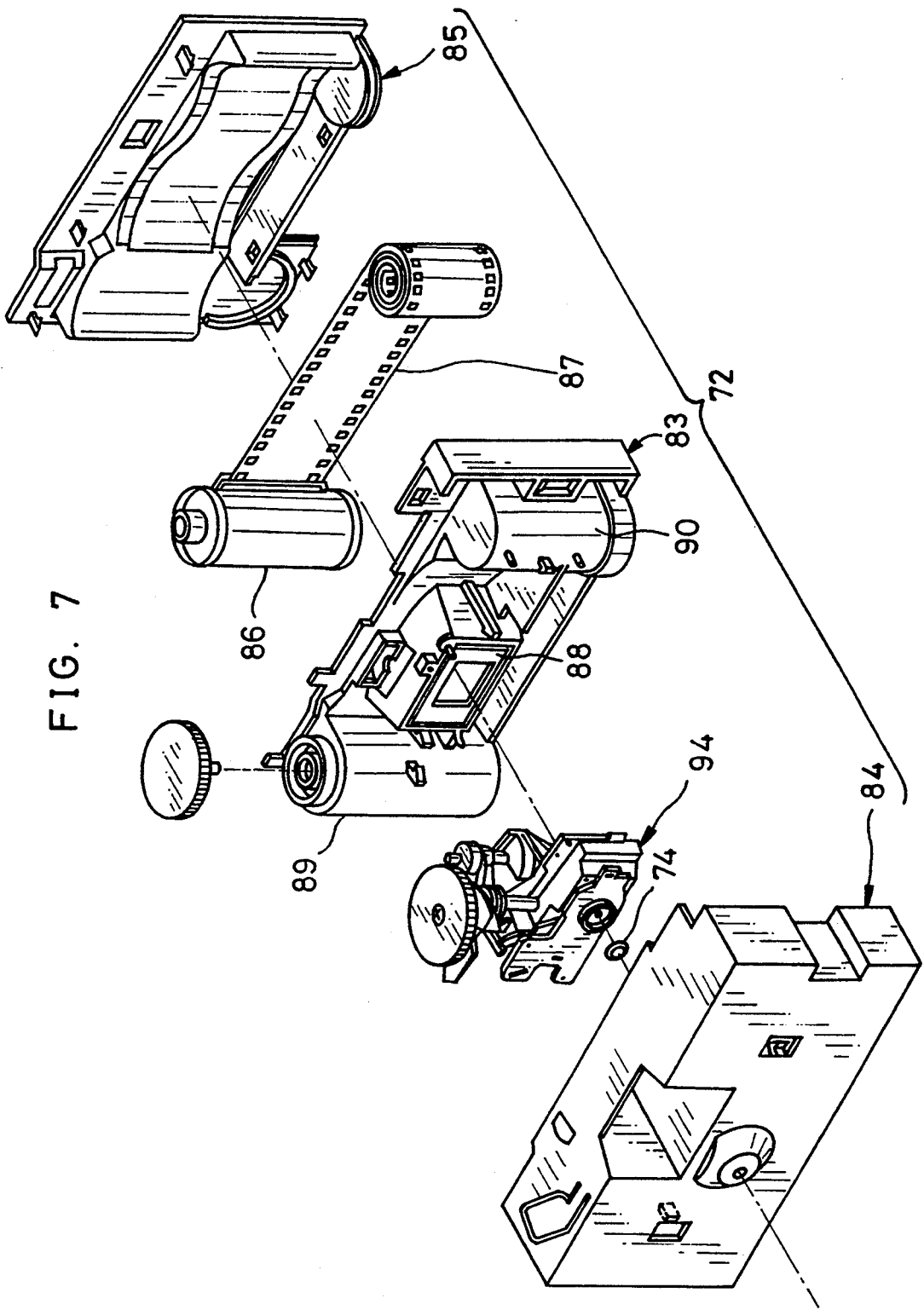
FIG. 7 is an exploded perspective view of the film housing of the film unit of FIG. 6.

Referring to FIG. 7, the film housing 72 is constituted of a main body 83, and front and rear covers 84, 85 which are attached to the main body 83 respectively from the front and rear. An exposure chamber 88 is formed in the center of the main body 83 on the rear side thereof. A film take-up chamber 89 and a film supply chamber 90 are disposed on opposite horizontal sides of the exposure chamber 88. A photographic film cassette 86 is contained in the film take-up chamber 89 while a photographic film 87 having been drawn out of the photographic film cassette 86 and wound in a roll is contained in the film supply chamber 90. A photo-taking unit 94 is attached to the front of the main body 83 by claws.

Figure 8:
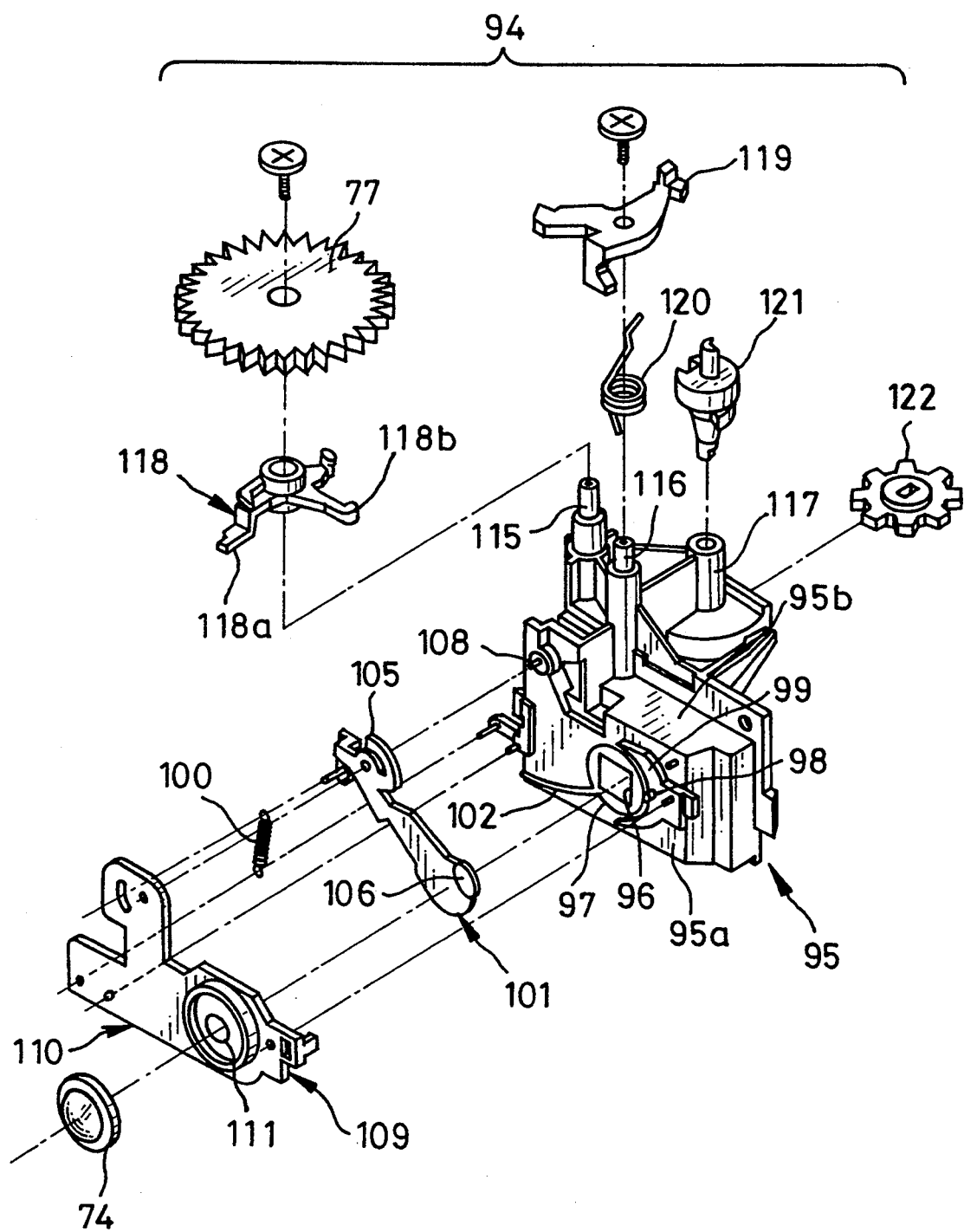
FIG. 8 is an exploded perspective view of the photo-taking unit of the film unit of FIG. 6.
Figure 9:
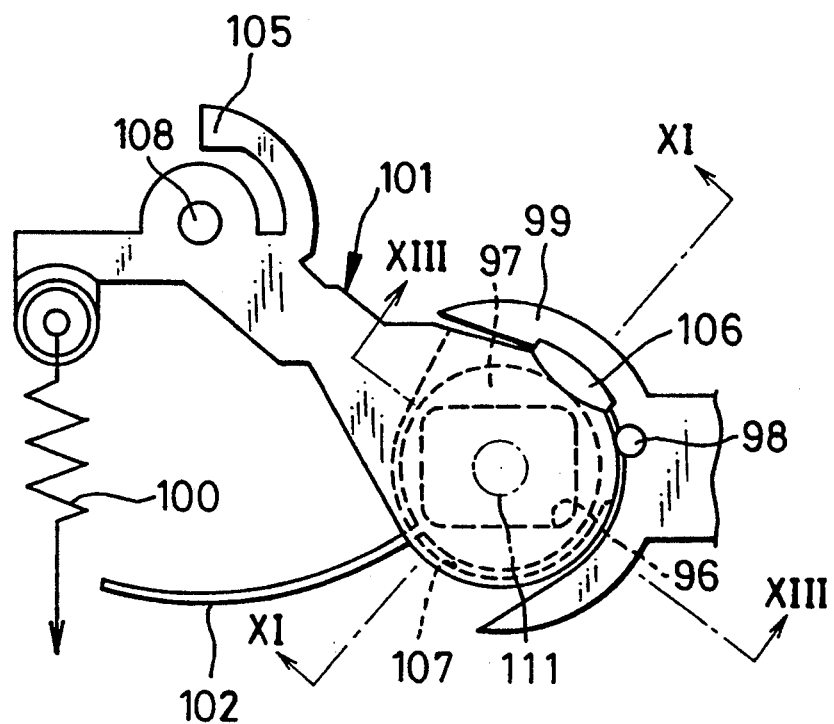
FIG. 9 is an explanatory view illustrating the shutter blade of FIG. 8 in the closed position.

In FIG. 8, which is an exploded perspective view of the photo-taking unit 94, a base section 95 has a shutter mount 95a and a mechanism plate 95b. The shutter mount 95a is formed in the center with a shutter opening 96 about which a projection 97 having an orange-peel surface or a tough surface is formed. On the right side of the projection 97 are provided a stop 98 and a light-shielding member 99 having a crescent shape. The stop 98 contacts the right edge portion of a shutter blade 101 biased counterclockwise by a spring 100 and stops the shutter blade 101 in the closed position, as illustrated in FIG. 9. The light-shielding member 99 prevents external light from passing through the gap between the base section 95 and the shutter blade 101 into the shutter opening 96 and especially through the gap on the right side of the shutter blade 101. A guide ridge 102 is formed on the front surface of the base section 95 and extends from the projection 97 toward the lower left. The guide ridge 102 is brought into contact with the rear surface of the shutter blade 101 to guide the shutter blade 101 when it swings.

The shutter blade 101 is a one-piece plastic molding and has a masking portion 104, a claw portion 105 and a protrusion 106 for preventing unevenness of exposure and having a sub-shutter function. A recess 107 is formed in the rear surface of the masking portion 104, recess 107 being bordered by a rim 107b. The shutter blade 101 is attached to the base section 95 via a pin 108 and a shutter cover 109, as illustrated in FIG. 8. The shutter cover 109 is provided with a lens holder 110 for holding the taking lens 74. A stop aperture 111 is formed in the center of the lens holder 110.

As illustrated in FIGS. 11 and 12, the protrusion 106 protrudes from the shutter blade 101 toward the shutter cover 109 and has an inclined surface 106a. The right-hand portion of the recess 107 is tapered up to the protrusion 106 to form an inclined surface 107a. This inclined surface 107a is formed on the right half portion of the recess 107, as indicated by a hatched portion in FIG. 10, so that the thickness of the masking portion 104 is reduced toward the right edge portion. When the shutter blade 101 is swung to a position as illustrated in FIG. 11, the photographic film 87 begins to be exposed to light from an object passing through the taking lens 74, the stop aperture 111 and the shutter opening 96. When the shutter blade 101 is swung further to a position as illustrated in FIG. 12, which is not yet fully open, the entire frame of the photographic: film 87 is exposed.

After the shutter blade 101 is fully opened, the shutter blade 101 is returned to the initial closed position by a spring 100. At that time, the masking portion 104 is slid over the projection 97. However, because the thickness of the right half portion of the masking portion 104 decreases toward its right edge portion, the projection 97 will not be brought into contact with the rear surface of the masking portion 104, enabling smooth return of the shutter blade 101 to the initial position. As illustrated in FIG. 13, when the shutter blade 101 has returned to the initial closed position, the rim 107b of the recess 107 fits about the projection 97 to close the shutter opening 96 surely to prevent external light from entering the gap between the base section 95 and the shutter blade 101, in cooperation with the light-shielding member 99. The rim 107b is provided with a shut-out 107c in which the guide ridge 102 is slidably received.

The mechanism plate 95b of the base section 95 is provided with shafts 115, 116 and a bearing 117. On the shaft 115 is fitted the film frame counter disk 77 and a shutter actuating lever 118 having an L-shaped arm 118a and a distal end 118b. An arresting lever 119 is mounted on the shaft 116 about which a spring 120 is provided under the arresting lever 119. One end of the spring 120 biases the shutter actuating lever 118 counterclockwise (FIG. 8) while the other end biases the arresting lever 119 clockwise. Upon depression of the shutter release button 76, the arresting lever 119 is rotated counterclockwise to cause the shutter actuating lever 118 to swing counterclockwise owing to the force of the spring 120. During this rotation, the arm 118a hits the claw portion 105 of the shutter blade 101 to swing the shutter blade 101 into an open position to uncover the exposure opening 96. Immediately thereafter, the shutter blade 101 is swung back counter-clockwise owing to the force of the spring 100 and stopped by the stop 98 in a closed position to close the shutter opening 96.

A shutter setting cam 121 is inserted in the bearing 117. The distal end 118b of the shutter actuating lever 118 is brought into contact with the shutter setting cam 121. A driven sprocket wheel 122 is coupled to the lower portion of the shutter setting cam 121 and is rotated counterclockwise (FIG. 8) when the photographic film 87 is wound by one frame. Upon film winding, the shutter setting cam 121 makes one rotation in the counterclockwise direction, and rotates the shutter actuating lever 118 into a charge position owing to the contact between the shutter setting cam 121 and the distal end 118b. At the same time, a single rotation of the shutter setting cam 121 causes the film frame counter disk 77 to be rotated by one step.

The operation of the film unit 71 with the above-structured shutter blade 101 will now be described. Upon rotating the film advancing wheel 78, the photographic film 87 is wound back into the photographic film cassette 86 by one frame. Simultaneously, the sprocket wheel 122 is rotated counterclockwise to rotate the shutter setting cam 121 in the same direction. As a result, the shutter actuating lever 118 is moved into the charge position and arrested by the arresting lever 119. At this time, the arresting lever 119 engages with the film advancing wheel 78 to prevents its further rotation.

When the shutter release button 76 is depressed after framing an object through a finder window 75, the arresting lever 119 is rotated counterclockwise. Thereby, the shutter actuating lever 118 is swung counterclockwise to cause its arm 118a to strike the claw portion 105 of the shutter blade 101 to swing the shutter blade 101 clockwise from the position illustrated in FIG. 9. When the shutter blade 101 is swung to the position illustrated in FIG. 11, the protrusion 106 blocks the stop aperture 111 so that light from the object begins to fall on the photographic film 87 to cause an image to start forming thereon. When the shutter blade 101 is swing up to the position illustrated in FIG. 12, which is not yet the fully open position, the full image is formed on the photographic film 87 owing to light advancing past the inclined surface 106a. Thus, due to the inclined surface 106a of the protrusion 106, it is possible to obtain the same effect as shortening the time for opening the shutter opening 96 fully but without making the speed of swinging of the shutter blade 101 faster, thereby contributing to a reduction of unevenness of exposure. Also, it is possible to prevent the shutter blade 101 from being shaken when swinging since the protrusion 106 is brought into contact with the shutter cover 109. Furthermore, the speed of swinging of the shutter blade 101 is balanced thanks to the projection 106. It is to be noted that since the projection 97 has an orange-peel or other rough surface, light passing through the stop aperture 110 and being reflected from its surface will not enter the shutter opening 96.

Figure 10:
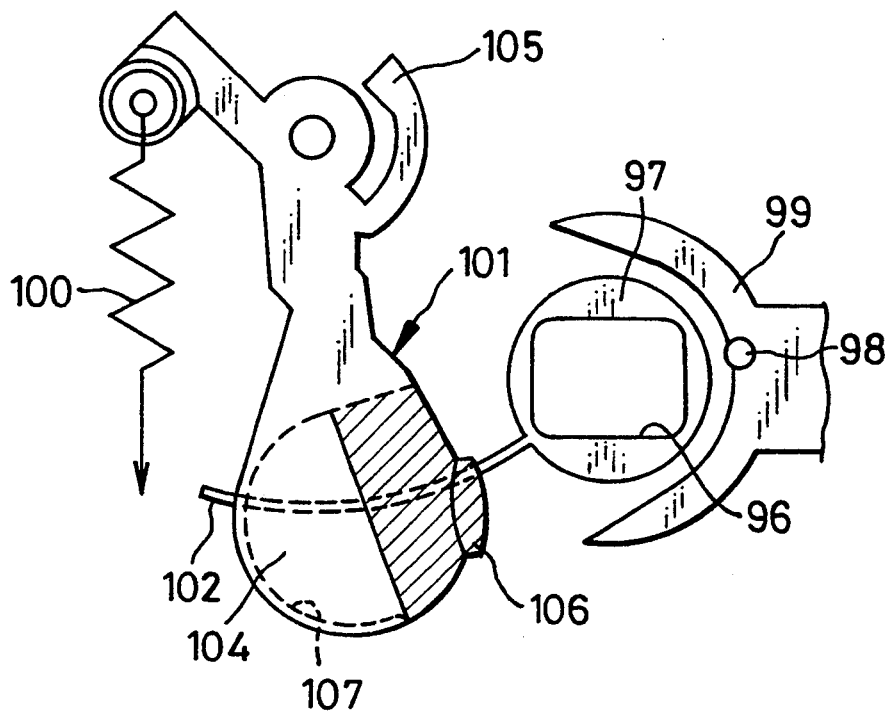
FIG. 10 is an explanatory view illustrating the shutter blade of FIG. 8 in the open position.

Immediately after the: shutter blade 101 reaches the position illustrated in FIG. 10, the shutter blade 101 is returned to the closed position illustrated in FIG. 9 by the spring 100. The shutter blade 101 is smoothly returned to tile close deposition without contacting the projection 97 thanks to the inclined surface 107a of the recess 107, and is stopped by tile stop 108. In the closed position, external light is prevented from entering the shutter opening 96 between the shutter blade 101 and the front starface of the base section 95 by a combination of the projection 97 for locking the stop aperture 111, the rim of the recess 107 and the light-shielding member 99. Thus, one exposure is carried out to form the image of an object on one frame of the photographic film 87. When the film advancing wheel 78 is rotated again, the photographic film 87 is wound by an amount corresponding to one frame to move the arm 118a of the shutter actuating lever 118 into the charge position to be ready to take the next photograph.

The protrusion 106 may be applicable to a shutter blade having a masking portion with no recess 107, that is, with a flat rear surface so as to prevent unevenness of exposure. Also, the wall 48 or the light-shielding member 99 may be formed beside a shutter blade having a masking portion with a flat rear surface. Furthermore, the base sections 29, 95 may be formed integrally with the respective main bodies 14, 83.

Although the present invention has been described above with reference to preferred embodiments, various changes and modifications will be apparent to those having skill in this field. Therefore, unless otherwise these changes and modifications depart from the scope of the present invention, is defined by the appended claims, they should be construed as being included therein.

What is claimed is:

1. A lens-fitted photographic film unit having a pre-loaded photographic film on which an image is formed through a taking lens system upon depression of a shutter release button, said film unit comprising:

a shutter mount and a projecting portion projecting forward of said shutter mount along an optical axis of the taking lens system, said projecting portion having a flat surface on a front side thereof;

a shutter opening on said optical axis formed in said flat surface of said projecting portion; and a shutter blade attached to said shutter mount, said shutter blade having a claw portion, an arm portion and a masking portion for opening and closing said shutter opening, said shutter blade being bent in a crank shape in the middle of said arm portion in a direction along said optical axis such that said masking portion is disposed farther forward than said claw portion so as to correspond in shape to said shutter mount and said projecting portion.

2. A lens-fitted photographic film unit as recited in claim 1, further comprising a shutter actuating lever with an L-shaped arm which moves from an initial position into a charged position upon winding said photographic film by one frame after exposure, and returns from said charged position to said initial position upon depression of said shutter release button, said claw portion of said shutter blade being struck by said arm of said shutter actuating lever to cause said shutter blade to move between a closed position and an open position when said shutter actuating lever returns from said charged position to said initial position.

3. A lens-fitted photographic film unit as recited in claim 1, wherein said shutter blade is swingably mounted on said shutter mount.

4. A lens-fitted photographic film unit as recited in claim 3, further comprising a spring biasing said shutter blade toward said closed position so as to return said shutter blade to said closed position after said shutter blade has been swung from said closed position to said open position.

5. A lens-fitted photographic film unit as recited in claim 1, further comprising a projection formed integrally with said projecting portion so as to project forward along the optical axis in such a manner as to surround said shutter opening.

6. A lens-fitted photographic film unit as recited in claim 1, wherein said masking portion has a recess and a semicircular rim surrounding said recess, said recess receiving said projection in said closed position, said semicircular rim being disposed on a side of a leading edge portion of said masking portion when said shutter blade moves from said closed position to said open position.

7. A lens-fitted photographic film unit as recited in claim 1, further comprising a semicircular wall formed integrally with said projecting portion so as to prevent light from entering said shutter opening between said masking portion and said projection on the side of a trailing edge portion of said masking portion when said shutter blade moves from said closed position to said open position.

8. A lens-fitted photographic film unit as recited in claim 7, further comprising a shutter cover having a flat portion attached to said shutter mount so as to cover said shutter blade in the vicinity of said claw portion and a second projecting portion projecting from said flat portion along the outline of said projecting portion formed on said shutter mount so as to cover said masking portion of said shutter blade and said wall.

9. A lens-fitted photographic film unit as recited in claim 8, further comprising a lens holder formed integrally on said projecting portion of said shutter cover for holding said taking lens system, and a lens cover fitting on said lens holder.

10. A lens-fitted photographic film unit as recited in claim 1, wherein said taking lens system comprises two taking lenses and a spacer inserted therebetween.

11. A lens-fitted photographic film unit as recited in claim 1, further comprising a flat mount mechanism formed integrally with said shutter mount to support a finder system, and a photographing mechanism.

12. A lens-fitted photographic film unit as recited in claim 9, further comprising a front cover having a second flat portion and a lens hood covering said projecting portion of said shutter cover and said lens cover fitted on said lens holder, said second flat portion being retracted rearward and lying in a plane including said flat portion of said shutter cover.

13. A lens-fitted photographic film unit as recited in claim 6, wherein said recess has a tapered surface formed approximately in a half portion of said recess on the side of a trailing edge portion of said masking portion when said shutter blade moves from said closed position to said open position, such that the thickness of said masking portion is reduced toward said trailing edge portion so as to prevent said tapered surface from being brought into contact with said projection formed around said shutter opening during movement of said shutter blade.

14. A lens-fitted photographic film unit as recited in claim 13, wherein said masking portion is provided on the side of said trailing edge portion with a protrusion which protrudes in a direction away from said shutter opening anti is formed on the side of said trailing edge portion integrally with a linearly inclined surface such that a root portion of said protrusion is thinner than a most protruding portion thereof.

15. A lens-fitted photographic film unit having a preloaded photographic film on which an image is formed through a taking lens system upon depression of a shutter release button, said film unit comprising:
 a shutter mount having a flat projection projecting forward along an optical axis of said taking lens system;
 a shutter opening formed in said projection on said optical axis of said taking lens system; and
 a shutter blade having a claw portion and a masking portion for opening and closing said shutter opening and being swingable between a closed position and an open position, said masking portion having on a surface facing said shutter opening a recess and a semicircular rim, said rim being disposed on the side of a leading edge portion of said masking portion when said shutter blade swings from said closed position to said open position, said recess having a tapered surface formed approximately in a half portion of said recess on the side of a trailing edge portion opposite to said leading edge portion of said masking portion such that the thickness of said masking portion decreases in a direction toward said trailing edge portion so as to prevent said tapered surface from being brought into contact with said projection formed around said shutter opening during swinging of said shutter blade, said projection fitting in said recess when said shutter blade is in said closed position.

16. A lens-fitted photographic film unit as recited in claim 15, further comprising a crescent-shaped light-shielding member which is formed on said shutter mount surrounding said trailing edge portion of said shutter blade when said shutter blade is in said closed position so as to prevent light from entering said shutter opening.

17. A lens-fitted photographic film unit as recited in claim 15, further comprising a shutter cover attached to said shutter mount in such a manner as to cover said shutter blade, said shutter cover having a lens holding portion for holding said taking lens system and a stop aperture formed in the center to said lens holding portion.

18. A lens-fitted photographic film unit as recited in claim 17, wherein said masking portion is provided on the side of the trailing edge portion with a protrusion which protrudes toward said shutter cover and swings so as to traverse said stop aperture during swinging of said shutter blade, said protrusion having an inclined surface such that a root portion of said protrusion is thinner than a most protruding portion thereof.

19. A lens-fitted photographic film unit as recited in claim 15, further comprising a shutter actuating lever with an L-shaped arm, which moves from an initial position into a charged position upon winding said photographic film by one frame after exposure, and returns from said charged position to said initial position upon depression of said shutter release button, said claw portion of said shutter blade being struck by said arm of said shutter actuating lever to cause said shutter blade to swing between said closed position and said open position when said shutter actuating lever returns from said charged position to said initial position.

20. A lens-fitted photographic film unit as recited in claim 15, further comprising a spring biasing said shutter blade toward said closed position so as to return said shutter blade to said closed position after said shutter blade has been swung from said closed position to said open position.

21. A lens-fitted photographic film unit as recited in claim 15, further comprising a ridge formed on said shutter mount extending from said projection in an arc so as to guide said masking portion of said shutter blade during swinging of said shutter blade.

22. A lens-fitted photographic film unit as recited in claim 15, further comprising a stop to retain said shutter blade in said closed position.

23. A lens-fitted photographic film unit having a preloaded photographic film on which an image is formed through a taking lens system upon depression of a shutter release button, said film unit comprising:
   a shutter mount;
   a shutter opening formed in said shutter mount;
   a shutter blade having a claw portion and a masking portion for opening and closing said shutter opening and being swingable between a closed position and an open position;
   a stop aperture disposed in front of said shutter blade; and
   a protrusion in said masking portion on a side of a trailing edge portion when said shutter blade swings from said closed position to said open position, said protrusion protruding toward said stop aperture and swinging so as to traverse said stop aperture during swinging of said shutter blade.

24. A lens-fitted photographic film unit as recited in claim 23, wherein said protrusion has an inclined surface such that a root portion of said protrusion is thinner than a most protruding portion thereof.

25. A lens-fitted photographic film unit having a preloaded photographic film on which an image is formed through a taking lens system upon depression of a shutter release button, said film unit comprising:
   a shutter mount having a flat projection projecting forward along an optical axis of said taking lens system;
   a shutter opening formed in said projection on said optical axis of said taking lens system; and
   a shutter blade having a claw portion and a masking portion for opening and closing said shutter opening and being swingable between a closed position and an open position, said masking portion having on a surface facing said shutter opening a recess and a semicircular rim, said rim being disposed on the side of a leading edge portion of said masking portion when said shutter blade swings from said closed position to said open position, said projection fitting in said recess when said shutter blade is in said closed position.

* * * * *